(12) United States Patent
Lai et al.

(10) Patent No.: US 6,744,933 B2
(45) Date of Patent: Jun. 1, 2004

(54) METHOD FOR IMAGE ALIGNMENT UNDER NON-UNIFORM ILLUMINATION VARIATIONS

(75) Inventors: Shang-Hong Lai, Saratoga, CA (US); Ming Fang, Princeton Jct, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 679 days.

(21) Appl. No.: 09/764,586

(22) Filed: Jan. 18, 2001

(65) Prior Publication Data

US 2002/0126915 A1 Sep. 12, 2002

(51) Int. Cl.$^7$ .................................................. G06K 9/32
(52) U.S. Cl. ...................................................... 382/294
(58) Field of Search ................................ 382/294–297; 358/450

(56) References Cited

U.S. PATENT DOCUMENTS

| | | | |
|---|---|---|---|
| 5,119,444 A | | 6/1992 | Nishihara ..................... 382/45 |
| 5,604,819 A | * | 2/1997 | Barnard ....................... 382/151 |
| 5,911,035 A | * | 6/1999 | Tsao ............................ 706/16 |
| 5,946,425 A | * | 8/1999 | Bove et al. .................. 382/294 |
| 6,173,087 B1 | * | 1/2001 | Kumar et al. ............... 382/284 |
| 6,434,265 B1 | * | 8/2002 | Xiong et al. ................ 382/154 |
| 6,549,651 B2 | * | 4/2003 | Xiong et al. ................ 382/154 |
| 6,621,929 B1 | * | 9/2003 | Lai et al. ..................... 382/217 |

OTHER PUBLICATIONS

Tabone S: "Detecting Junctions Using Properties of the Laplacian of Gaussian Detector" Proceedings of the 12$^{TH}$ IAPR International Conference, vol. 1, No. 1994, pp. 52–56, XP000926372 abstract.

Fang et al: "A FLASH system for fast and accurate pattern localization" Proc. of Spie. Mach. Vis. Appli. Indus., vol. 3652, pp. 164–173, XP008002531 California cited in the application abstract.

Ulupinar, F; Medioni G: "Refining edges detected by a LoG operator" Computer Vision and Pattern Recognition, 1998, pp. 202–207, XP000926371 abstract.

Lai S–H etal: "An Accurate and Fast Pattern Localization Algorithm for Automated Visual Inspection" Real–Time Imaging, Academic Press Limited, GB, vol. 1, No. 5, Feb. 1999, ISSN: 1077–2014 cited in the application abstract.

* cited by examiner

Primary Examiner—Jingge Wu
(74) Attorney, Agent, or Firm—Donald B. Paschburg; F. Chau & Associates, LLP

(57) ABSTRACT

A method for matching images includes the step of providing a template image and an input image. A Laplacian-of-Gaussian filtered log (LOG-log) image function is computed with respect to the template image and the input image to obtain a Laplacian-of-Gaussian filtered template image and a Laplacian-of-Gaussian filtered input image, respectively. An energy function is minimized to determine estimated geometric transformation parameters and estimated photometric parameters for the input image with respect to the template image. The energy function is formed by weighting non-linear least squared differences of data constraints corresponding to locations of both the Laplacian-of-Gaussian filtered template image and the Laplacian-of-Gaussian filtered input image. The estimated geometric transformation parameters and the estimated photometric parameters are output for further processing. The method allows for image matching under non-uniform illumination variations.

21 Claims, 8 Drawing Sheets

METHOD FOR IMAGE ALIGNMENT UNDER NON-UNIFORM ILLUMINATION VARIATIONS

BACKGROUND

1. Technical Field

The present invention generally relates to image alignment and, in particular, to a method for aligning images under non-uniform illumination variations.

2. Background Description

Image alignment is a critical problem in industrial imaging inspection. Traditional image alignment methods, including the normalized correlation method, are based on matching of image intensities. Unfortunately, the traditional image alignment methods are not robust against non-uniform illumination variations. Recently, the geometrics-based alignment approach has emerged as the prevalent image alignment method, mainly due to its robustness under very different illumination conditions. The intensity-based alignment approach is based on region-based matching, while the geometrics-based alignment approach is a contour-based approach. In general, the region-based approach is more accurate and noise-resistant than the contour-based approach for image alignment under the same illumination conditions. This is primarily due to the fact that contour extraction is susceptible to noise. In addition, the region-based matching utilizes two-dimensional (2D) information, which is richer than the on-dimensional (1D) information utilized by the contour-based approach.

The image reference approach (see R. T. Chin, "Automatic Visual Inspection: 1981 to 1987", Computer Vision, Graphics, and Image Processing, Vol. 41, No. 3, pp. 346–81, 1988.) is very popular in automatic visual inspection due to its general applicability to a variety of inspection tasks. However, the image reference approach requires very precise alignment of the inspection pattern in the image. To achieve very precise pattern alignment, traditional template matching is extremely time-consuming when the search space is large and/or rotation or scaling is allowed. Some methods have been proposed to resolve this alignment problem. For example, see the following articles: Jain et al., "A Survey of Automatic Visual Inspection", Computer Vision and Image Understanding, Vol. 61, No. 2, pp. 231–62, 1995; Mandeville et al., "Image Registration for Automated Inspection of Printed Circuit Patterns Using CAD Reference Data", Machine Vision and Applications, Vol. 6, pp. 233–42, 1993; and Hiroi et al., "Precise Visual Inspection for LSI Wafer Patterns Using Subpixel Image Alignment", Proc. Second IEEE Workshop on Applications of Computer Vision, pp. 26–34, Florida, December 1994. In the above article by Mandevelle et al., an image registration technique fits feature points in the zero-crossings extracted from the inspection image to the corresponding points extracted from the CAD model via an affine transformation. However, the correspondence between the two sets of features usually cannot be reliably established. In the above article by Hiroi et al., a sum-of-squared-differences (SSD) based method determines the shift between the two images. Unfortunately, this method is restricted to recovering small shifts.

An algorithm referred to as the FLASH (Fast Localization with Advanced Search Hierarchy) algorithm provides fast and accurate object localization in a large search space. The FLASH algorithm is an intensity-based matching approach, and is described by Fang et al., in "A FLASH System for Fast and Accurate Pattern Localization", Proceedings of SPIE Conf. on Machine Vision Applications in Industrial Inspection VII, Vol. 3652, pp. 164–73, San Jose, Calif., Jan. 25–27, 1999. The FLASH algorithm is based on the assumption that the surrounding regions of the template within the search range are fixed relative to the template. The FLASH algorithm includes a hierarchical nearest-neighbor search algorithm and an optical-flow based energy minimization algorithm. The former is described in the above article by Fang et al., and the latter is described by Fang et al., "An Accurate and Fast Pattern Localization Algorithm for Automated Visual Inspection," Real-Time Imaging, Vol. 5, pp. 3–14, 1999.

The hierarchical nearest-neighbor search algorithm produces rough estimates of the transformation parameters for the optical-flow based energy minimization algorithm which, in turn, provides very accurate estimation results and associated confidence measures.

However, there is still a need for a method that aligns images under non-uniform illumination variations.

SUMMARY OF THE INVENTION

The problems stated above, as well as other related problems of the prior art, are solved by the present invention, a method for image alignment under non-uniform illumination variations.

According to a first aspect of the invention, there is provided a method for matching images. The method includes the step of providing a template image and an input image. A Laplacian-of-Gaussian filtered log (LOG-log) image function is computed with respect to the template image and the input image to obtain a Laplacian-of-Gaussian filtered template image and a Laplacian-of-Gaussian filtered input image, respectively. An energy function formed by weighting non-linear least squared differences of data constraints corresponding to locations of both the Laplacian-of-Gaussian filtered template image and the Laplacian-of-Gaussian filtered input image is minimized to determine estimated geometric transformation parameters and estimated photometric parameters for the input image with respect to the template image. The estimated geometric transformation parameters and the estimated photometric parameters are output for further processing.

According to a second aspect of the invention, the method further includes the step of extracting wavelet features from an image gradient corresponding to the input image. A nearest-neighbor feature vector is identified from a set of training data with respect to the wavelet features. The training data is obtained by simulating a geometrical transformation on the template image with geometric parameters of the nearest-neighbor feature vector being uniformly sampled from a given search space. An initial guess is generated for the estimated geometric transformation parameters, based upon the geometric parameters of the nearest-neighbor feature vector. The initial guess is utilized by the minimizing step to determine the estimated geometric transformation parameters.

According to a third aspect of the invention, the minimizing step includes the step of selecting pixel locations in the Laplacian-of-Gaussian filtered template image having a largest reliability measure. Gradients and qualities for the selected pixel locations are computed.

According to a fourth aspect of the invention, the geometric parameters include a translation vector, a rotation angle, and/or a size scaling factor.

According to a fifth aspect of the invention, the minimizing step further includes the step of calculating a Hessian matrix and a gradient vector of the energy function based on an initial guess of the geometric transformation parameters. The initial guess is updated based on the calculating of the Hessian matrix and the gradient vector of the energy function. The Hessian matrix and the gradient vector of the energy function are iteratively recalculated until an updated guess is within an acceptable increment from a previous updated guess.

According to a sixth aspect of the invention, the computing step includes the step of applying a Gaussian filter to the template image and the input image to obtain a Gaussian filtered template image and a Gaussian filtered input image, respectively. A Laplacian operation is applied to the Gaussian filtered template image and the Gaussian filtered input image to obtain the Laplacian-of-Gaussian filtered template image and the Laplacian-of-Gaussian filtered input image, respectively.

According to a seventh aspect of the invention, the Gaussian filtered template image and the Gaussian filtered input image have reduced noise with respect to the template image and the input image, respectively, and the Laplacian-of-Gaussian filtered template image and the Laplacian-of-Gaussian filtered input image have reduced non-uniform illumination with respect to the template image and the input image, respectively.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for image alignment under non-uniform illumination variations. It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
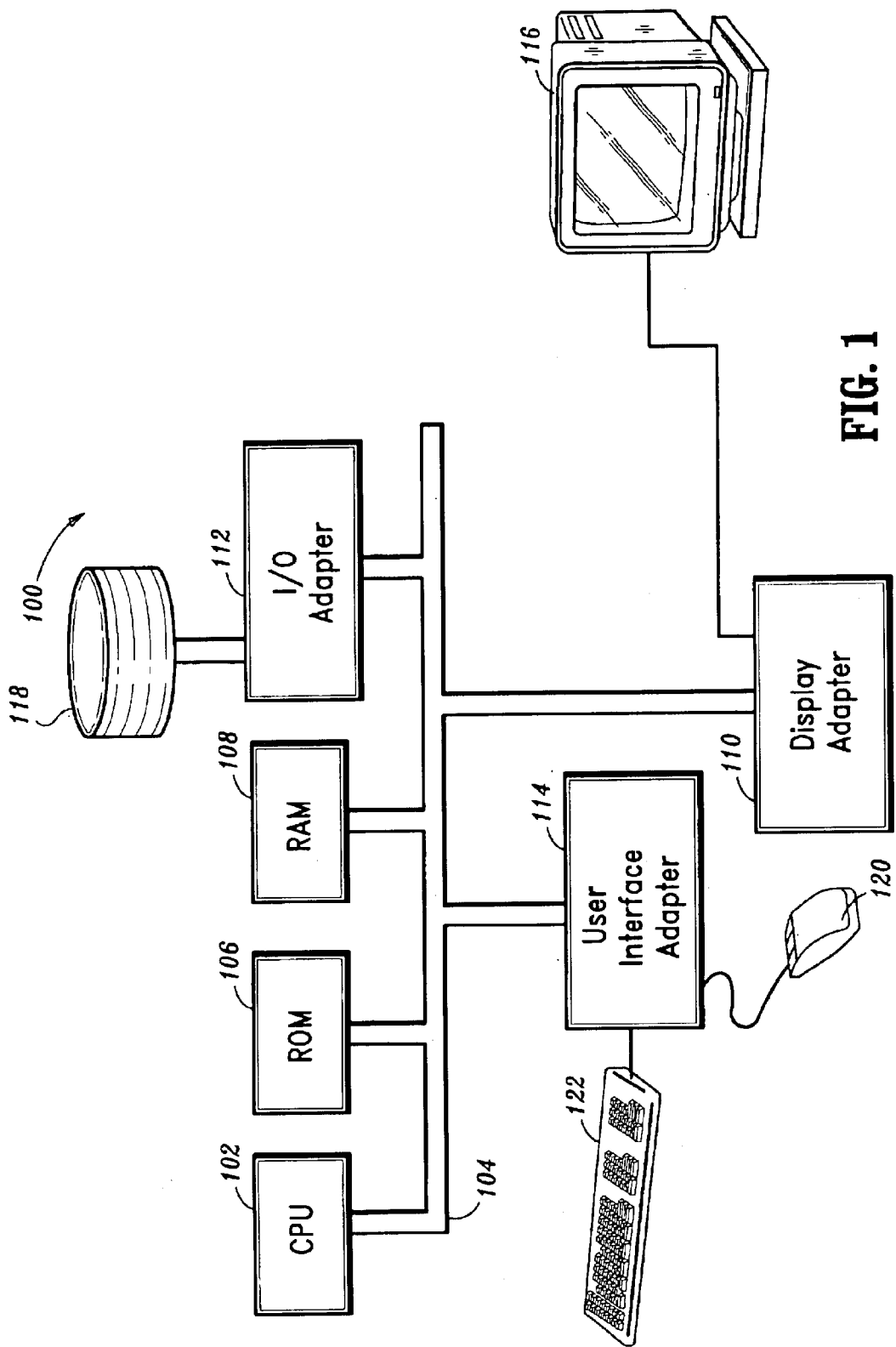
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

A brief description of the image alignment problem addressed by the present invention will now be given. The problem may be considered as a 2-D object localization problem in machine vision for image reference. Assume the reference image is denoted by $I_0(x,y)$ and the template object is given inside a window $W=\{(x,y)|x_0 \leq x \leq x_1, y_0 \leq y \leq y_1\}$ of the reference image. The 2-D object localization is to find the best match of the template in the input image $I_1(x,y)$ with a geometric transformation T.

Figure 2:
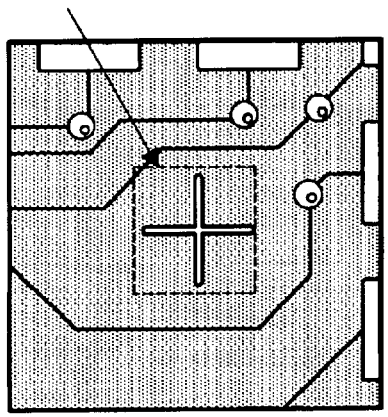
FIG. 2 is a block diagram illustrating a template image (reference image) of part of an IC board with a template window W indicated by a dashed window, according to the prior art.

FIG. 2 is a block diagram illustrating a template image (reference image) of part of an IC board with a template window W indicated by a dashed window, according to the prior art.

For the purposes of the invention, it is presumed that the geometric transformation between the input image and the reference image is a scaled 2D rigid transformation, i.e., the transformed location (u,v) at the location (x,y) can be written as:

$$\begin{pmatrix} u \\ v \end{pmatrix} = \sigma \begin{pmatrix} \cos\theta & -\sin\theta \\ \sin\theta & \cos\theta \end{pmatrix} \begin{pmatrix} x - x_c \\ y - y_c \end{pmatrix} + \begin{pmatrix} x_c + \Delta x \\ y_c + \Delta y \end{pmatrix}$$

where $(\Delta x, \Delta y)$ is the translation vector, $\theta$ is the rotation angle, $\sigma$ is the size scaling factor, and $(x_c, y_c)$ is the center of rotation. In the illustrative embodiment described herein, it is presumed that the center of rotation is at the image center. Let the reference and the input images be denoted by $I_0(x,y)$ and $I_1(x,y)$, respectively. In addition to the aforementioned geometric transformation, the photometric transformation between the input and reference images is assumed to be a combination of uniform illumination scaling and bias operations. To be more specific, these two images are related by the following equation:

$$I_0(x+u, y+v) = aI_1(x,y) + b$$

where a is the multiplication factor and b is the offset constant to model the illumination change. The goal of image alignment is to find a very precise estimate of the geometric transformation parameters, namely, the translation vector, the rotation angle, and the size scaling factor. In addition to the above geometric parameters, the photometric parameters (i.e., a and b) may also be estimated in various embodiments of the present invention such as, for example, when the image intensity matching mode is used.

Figure 3:
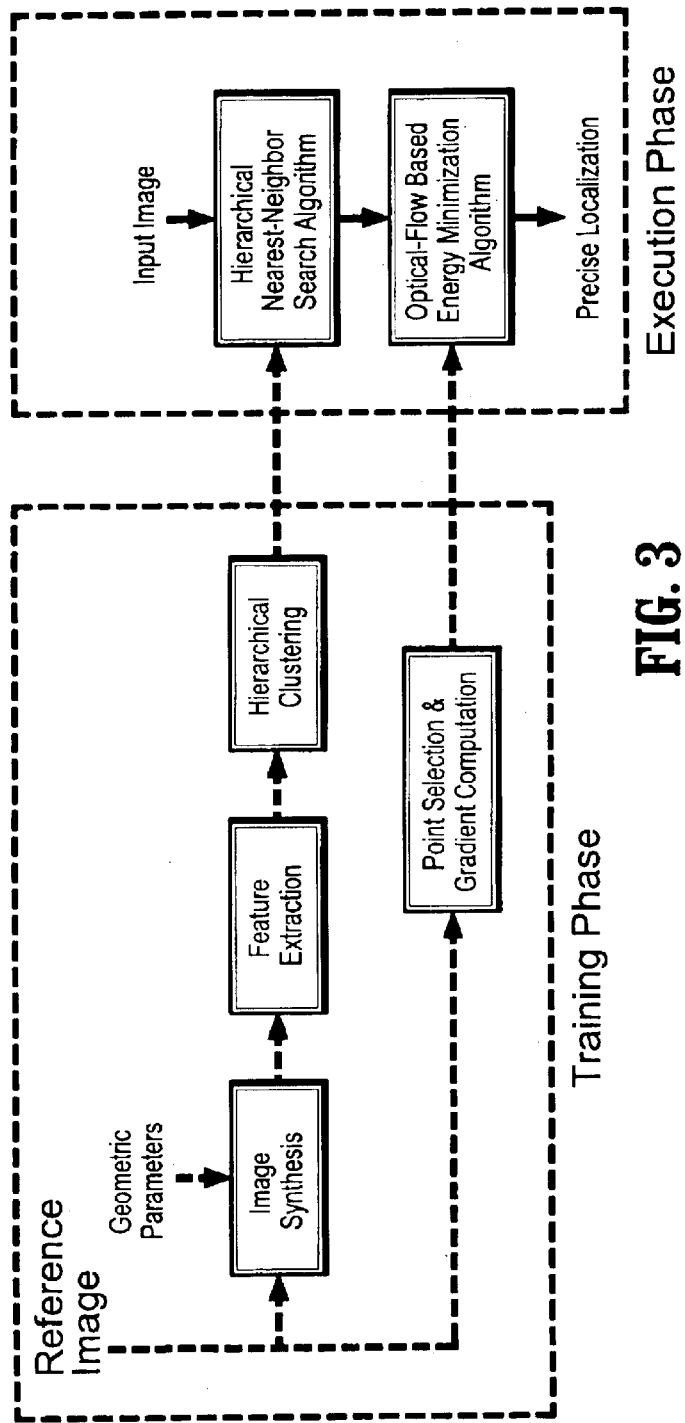
FIG. 3 is a high level block diagram illustrating a training phase 302 and an execution phase 304 of the present invention, according to an illustrative embodiment thereof.

A general description of the present invention will now be provided with respect to FIG. 3, to introduce the reader to the concepts of the invention. Subsequently, more detailed descriptions of various aspects of the invention will be provided with respect to FIGS. 4 through 8.

The present invention is an extension of the Flash algorithm described by Fang et al., in "A FLASH System for Fast and Accurate Pattern Localization", Proceedings of SPIE Conf. on Machine Vision Applications in Industrial Inspection VII, Vol. 3652, pp. 164–73, San Jose, Calif., Jan. 25–27, 1999. The Flash algorithm is also described in U.S. Ser. No. 09/236,725, entitled "A Flash System for Fast and Accurate Pattern Localization", filed on Jan. 25, 1999, the disclosure of which is commonly assigned and is incorporated by reference herein. The present invention enables accurate alignment in the presence of non-uniform illumination variations. This is accomplished by matching the Laplacian-of-Gaussian filtered logarithmic (LOG-log) intensity function instead of the raw intensity function. Experimental results described below illustrate that image alignment based on LOG-log intensity matching is robust against smooth non-uniform illumination changes.

FIG. 3 is a high level block diagram illustrating a training phase 302 and an execution phase 304 of the present invention, according to an illustrative embodiment thereof. The execution phase 304 includes: a hierarchical nearest-neighbor (HNN) search 350; and an optical-flow based energy minimization alignment 355. The training phase 302 corresponds to both the HNN search 350 and the optical-flow based energy minimization alignment 355. The training phase 302 for the HNN search 350 includes: image synthesis 310; feature extraction 315; and hierarchical clustering 320. The training phase 302 for the optical-flow based energy minimization alignment 355 includes point selection and gradient computation 325.

The HNN search 350 extracts some representative wavelet features after pre-processing the image 310. Then, the HNN search finds the nearest-neighbor feature vector from a set of training data obtained by simulating geometrical transformation on the reference image with the geometric parameters uniformly sampled from a given search space 315. The corresponding geometric parameters of the nearest-neighbor solution gives a rough pose of the input image. The optical-flow energy minimization 355 uses this rough pose as an initial solution and provides an accurate solution after an iterative process.

Note that there are two modes for the optical-flow energy minimization alignment 355, i.e., the raw intensity matching mode and the Laplacian-of-Gaussian filtered logarithmic (LOG-log) image matching mode.

In the execution phase 304, the HNN search 350 not only provides approximate pose estimates for the next stage but also determines the mode of the optical-flow based energy minimization alignment 355. This is because the energy minimization based on the LOG-log image matching takes much more time than that of raw intensity matching. In general, the image intensity matching mode is selected for most cases with uniform illumination changes, while the LOG-log image matching mode is selected for the cases with non-uniform illumination changes. This mode selection is accomplished by using two sets of wavelet features for the hierarchical nearest-neighbor networks. One set is the wavelet features computed from the original intensity image, and the other set is the wavelet features computed from the absolute gradient image. In the computation of distance between the feature vectors, the Euclidean distances for both sets of wavelet features are computed and the smaller one is selected as the distance. When the feature set computed from the original intensity image leads to a smaller distance, the raw intensity matching mode is selected for the optical-flow based energy minimization alignment 355. Otherwise, the LOG-log mode is selected.

Figure 4:
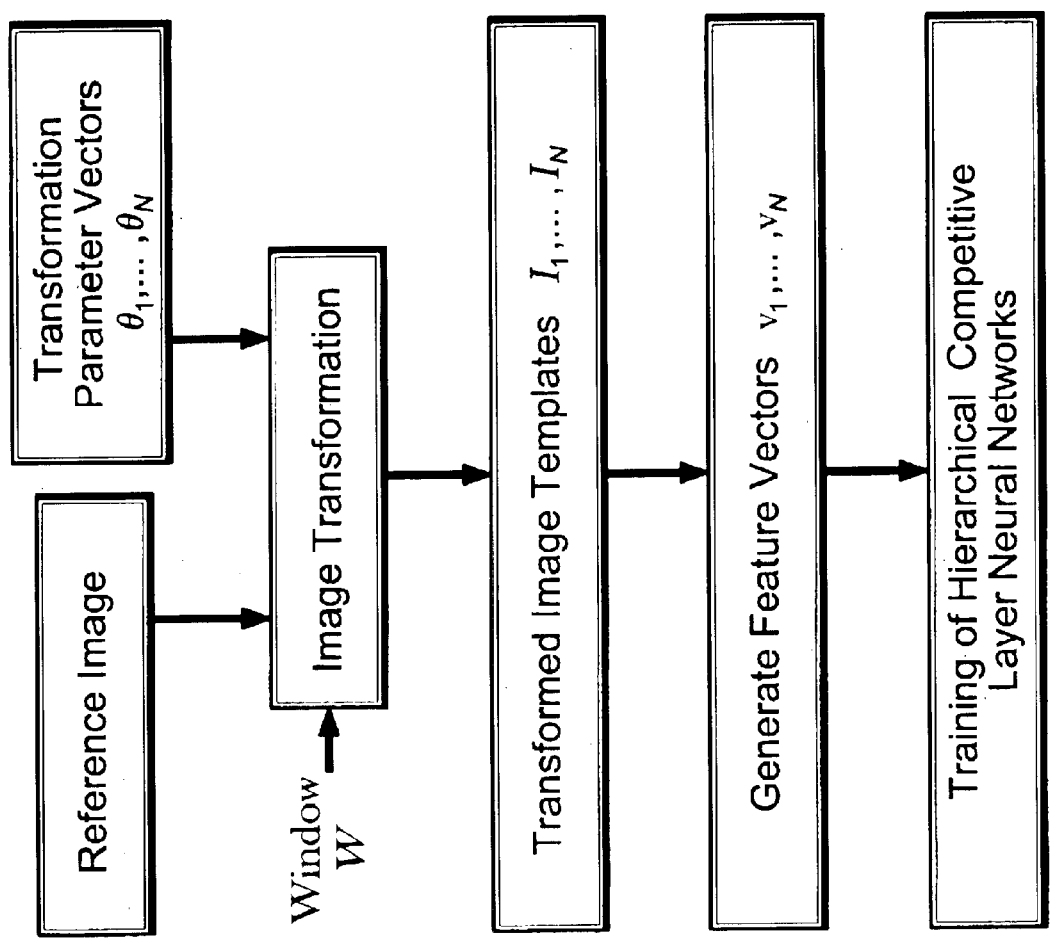
FIG. 4 is a flow diagram illustrating the training of the hierarchical nearest-neighbor search 350, according to an illustrative embodiment of the invention.

A more detailed description of the hierarchical nearest-neighbor (HNN) 350 search will now be given with respect to FIG. 4. FIG. 4 is a flow diagram illustrating the training of the hierarchical nearest-neighbor search 350, according to an illustrative embodiment of the invention. The training of the HNN search 350 includes: image transformation 415, given a reference image 405 and transformation parameter vectors 410; transformed image templates 420; generation of feature vectors 425; and training of hierarchical competitive layer neural networks 430. The preceding elements are described in detail as follows.

The HNN search 350 for the object localization is based on the learning-from-examples principle. A hierarchical nearest-neighbor network is constructed from the training examples synthesized from the geometric transformation of the reference image 405 with the transformation parameters uniformly sampled from the parameter search space. The transformation parameter vector 410 of the nearest-neighbor sample in the hierarchical network provides the approximate object localization. To improve the efficiency of the search algorithm, we find the best match based on the comparisons between feature vectors computed from the images, instead of comparing directly between images. The feature vector matching strategy involves computing a representative feature vector for each image inside the template window and finding the best match as follows $$\hat{k} = \underset{k}{\arg\min} \sum_{i=1}^{p} \left(v_i^{(k)} - u_i\right)^2, \quad (1)$$

where u and $v^{(k)}$, $1 \leq k \leq N$, are p-dimensional feature vectors for the input image F(x,y) and transformed reference images $I_k(x,y)$ inside the template window W. The feature vector used herein contains normalized wavelet features computed from the image and the image gradient.

The feature vector generation 425 involves the following steps. At first, the image inside the template window W is re-sampled to a size with both its width and height being a power of 2. This is primarily used for preparing the image data for wavelet transformation. Subsequently, the wavelet transformation of the re-sampled image is computed. Then, the wavelet coefficients at the lowest-resolution level are put into a vector. Finally, the vector is subtracted by its mean values and normalized by the standard deviation to obtain the normalized wavelet feature vector of the image. The above process is repeated by substituting the original image intensity by its image gradient. Thus, the feature vector consists of two parts, namely the normalized wavelet features computed from the original image intensity and the normalized wavelet features computed from the image gradient. The two parts are combined into a single vector by concatenation. The inclusion of wavelet features from image gradient makes the present invention more robust against illumination changes.

The feature vectors $v^{(k)}$ can be computed and stored in the training phase 302. In the execution phase 304, only the computation of the feature vector u and the search of the best match between u and all $v^{(k)}$ are required. The use of representative feature vector is principally a dimensionality reduction procedure to reduce the storage as well as the computation required by the present invention.

After the wavelet feature vectors for all the synthesized images are computed and stored in the training data set. A modified competitive layer network is constructed to build a hierarchical organization of the training data set. This is helpful for efficient nearest-neighbor search of the training data.

The hierarchical clustering of entire feature vectors $v_1, \ldots, v_N$ is accomplished by using a hierarchical competitive network, which is a modification of a competitive network. The modification involves the output of multiple best matches instead of a single best-match output in the clustering network. The training of the competitive networks is an unsupervised learning process. According to an illustrative embodiment of the present invention, Kohonen's learning rule is employed in the unsupervised training process. Of course, the present invention is not limited to the use of Kohonen's learning rule and, thus, other methodologies may be employed in the unsupervised training process, while maintaining the spirit and scope of the invention.

Note that the distance measure between two feature vectors in the training and execution of the hierarchical competitive networks are computed as follows:

$$d(u,v) = \min(\|u^{(i)} - v^{(i)}\|, \|u^{(g)} - v^{(g)}\|)$$

where the superscript (i) denotes the wavelet feature vector computed from the image intensity, and the superscript (g) denotes the wavelet feature vector computed from the image gradient. The symbol $\psi \; \psi$ represents an Euclidean norm between two vectors.

A more detailed description of optical-flow based energy minimization alignment 355 will now be given according to an illustrative embodiment of the invention.

The optical-flow based energy minimization alignment 355 is an accurate and efficient image alignment method. This method iteratively refines the initial rough solution provided by the HNN search 350. There are two modes of the optical-flow based energy minimization alignment 355. One is the raw-intensity matching mode and the other is the LOG-log intensity matching mode. The former is robust against random noises, and the latter is insensitive to non-uniform illumination variations. The mode of matching is also determined by the HNN search 350 based on the type of features used in the nearest-neighbor solution. For the wavelet features extracted from the original image, the raw-intensity matching mode is used, while the LOG-log intensity matching mode is used when the best solution in the HNN search 350 is based on comparing the wavelet features extracted from the absolute gradient images.

With respect to optical-flow based energy minimization alignment 355, a more detailed description of the raw intensity matching mode will now be given according to an illustrative embodiment of the invention. This energy minimization is an iterative process that takes the approximate geometric parameters estimated from the hierarchical nearest-neighbor search as the initial guesses. The initial illumination scaling and bias factors are first estimated by comparing the means and standard deviations of the intensity values in the neighborhoods of the selected locations in the reference image and those of the corresponding pixels in the input image. The optical-flow based energy minimization alignment 355 minimizes the energy function, given the initial geometric and photometric parameters.

The energy function to be minimized is a sum of squared modified optical flow constraints given as follows, $$E(\Delta x, \Delta y, \theta, \sigma, a, b) = \sum_i w_i (I_{x,i}(\Delta x + x_c - x_i) + I_{y,i}(\Delta y + y_c - y_i) + \sigma(f_i \cos\theta + g_i \sin\theta) - f_i + I_0(x_i, y_i) - aI_1(x_i, y_i) - b)^2$$

where $w_i$ is the weight associated with the i-th constraint selected at the location $(x_i, y_i)$, $I_{x,i}$ and $I_{y,i}$ are the partial derivatives of the reference image $I_0(x,y)$ along the x and y directions respectively at the location $(x_i, y_i)$, $f_i = I_{x,i}(x_i - x_c) + I_{y,i}(y_i - y_c)$, $g_i = -I_{x,i}(y_i - y_c) + I_{y,i}(x_i - x_c)$, and a is the multiplication factor and b is the offset factor to model the uniform illumination change. This energy minimization problem is a nonlinear least square minimization problem.

By using the Newton update as well as a warping-and-estimation scheme in each iteration of energy minimization, we have the following iterative numerical algorithm:

k=0

Repeat until Converged

Compute the Hessian $H^{(k)}$ and gradient $g^{(k)}$ for $$E'(\Delta x, \Delta y, \theta, \sigma, a, b; \Delta x^{(k)}, \Delta y^{(k)}, \theta^{(k)}, \sigma^{(k)}) \text{ at } (\Delta x, \Delta y, \theta, \sigma, a, b) =$$

$$(0, 0, 0, 1, a^{(k)}, b^{(k)})$$

-continued $$\begin{pmatrix} \Delta \hat{x} \\ \Delta \hat{y} \\ \hat{\theta} \\ \hat{\sigma} \\ \hat{a} \\ \hat{b} \end{pmatrix} = H^{(k)-1} g^{(k)},$$

$$\sigma^{(k+1)} = \frac{\sigma^{(k)}}{1 - \hat{\sigma}}$$

$$\theta^{(k+1)} = \theta^{(k)} + \hat{\theta},$$

$$\begin{pmatrix} \Delta x^{(k+1)} \\ \Delta y^{(k+1)} \end{pmatrix} = \begin{pmatrix} \Delta x^{(k)} \\ \Delta y^{(k)} \end{pmatrix} + \sigma^{(k+1)} R(\theta^{(k+1)}) \begin{pmatrix} \Delta \hat{x} \\ \Delta \hat{y} \end{pmatrix},$$

$$a^{(k+1)} = a^{(k)} - \hat{a},$$

$$b^{(k+1)} = b^{(k)} - \hat{b},$$

$$k = k + 1,$$

Return

Note that the Hessian matrix $H^{(k)}$ is approximated by the outer product $g^{(k)}$ is the gradient of the energy function $E'(\Delta x, \Delta y, \theta, \sigma, a, b; \Delta x', \Delta y', \theta', \sigma', a', b')$ with respect to the parameter vector $(\Delta x, \Delta y, \theta, \sigma, a, b)$ and is given by $$g^{(k)} = 2 \sum_{i=1}^{n} w_i \begin{pmatrix} I_{x,i} h_i(\Delta x^{(k)}, \Delta y^{(k)}, \theta^{(k)}, \sigma^{(k)}, a^{(k)}, b^{(k)}) \\ I_{y,i} h_i(\Delta x^{(k)}, \Delta y^{(k)}, \theta^{(k)}, \sigma^{(k)}, a^{(k)}, b^{(k)}) \\ g_i h_i(\Delta x^{(k)}, \Delta y^{(k)}, \theta^{(k)}, \sigma^{(k)}, a^{(k)}, b^{(k)}) \\ f_i h_i(\Delta x^{(k)}, \Delta y^{(k)}, \theta^{(k)}, \sigma^{(k)}, a^{(k)}, b^{(k)}) \\ -F_i h_i(\Delta x^{(k)}, \Delta y^{(k)}, \theta^{(k)}, \sigma^{(k)}, a^{(k)}, b^{(k)}) \\ -h_i(\Delta x^{(k)}, \Delta y^{(k)}, \theta^{(k)}, \sigma^{(k)}, a^{(k)}, b^{(k)}) \end{pmatrix}$$

where $h_i(\Delta x^{(k)}, \Delta y^{(k)}, \theta^{(k)}, a^{(k)}, b^{(k)})$ is the residue of the data constraint at the location $(x_i, y_i)$ and can be written as $I_{x,i}(x_c-x_i) + I_{y,i}(y_c-y_i) + f_i + \Delta I(x_i, y_i; \Delta x^{(k)}, \Delta y^{(k)}, \theta^{(k)}, \sigma^{(k)}, a^{(k)}, b^{(k)})$.

With respect to optical-flow based energy minimization alignment, a more detailed description of the LOG-log intensity matching mode will now be given according to an illustrative embodiment of the invention. This mode is the training phase of the optical-flow based energy minimization alignment using Laplacian-of-Gaussian filtered log (LOG-log) image. The image alignment is based on the matching between the LOG-log image functions instead of the image intensity functions. This mode of matching is very useful in achieving very accurate image alignment under non-uniform illumination variations. Assume a spatially-varying illumination model given as follows, $$I_0(x+u, y+v) = \alpha(x,y) I_1(x,y) + b$$

where the illumination multiplicative factor $\alpha(x,y)$ is a smoothly varying function and the bias b is a constant. We take the logarithmic operations on both sides of the equation and obtain the following equation after some approximation, $$I'_0(x+u, y+v) = \alpha'(x,y) + I'_1(x,y)$$

where $I'_0(x,y) = \log(I_0(x,y))$, $\alpha'(x,y) = \log(\alpha(x,y))$, and $I'_1(x,y) = \log(I_1(x,y+b))$. By taking the Laplacian operations on both sides, we obtain the following equation $$\Delta I'_0(x+u, y+v) = \Delta I'_1(x,y).$$

Note that the term $\Delta \alpha'(x,y)$ is neglected in the above equation since the function $\alpha(x,y)$ is a smooth function. Thus, we can make the first-order Taylor series approximation on the left-hand-side of the above equation and obtain the following optical flow constraint, $$F_{x,i}(\Delta x + x_c - x_i) + F_{y,i}(\Delta y + y_c - y_i) + \sigma(f_i \cos\theta + g_i \sin\theta) - f_i + F_0(x_i, y_i) - F_1(x_i, y_i) = 0$$

where $F_0(x,y) = \Delta I'_0(x,y)$, $F_1(x,y) = \Delta I'_1(x,y)$, $F_{x,i}$ and $F_{y,i}$ are the partial derivatives of the function $F_0(x,y)$ along the x and y directions respectively at the location $(x_i, y_i)$, $f_i = F_{x,i}(x_i - x_c) + F_{y,i}(y_i - y_c)$, and $g_i = -F_{x,i}(y_i - y_c) + F_{y,i}(x_i - x_c)$. numerical computation $F_{x,i}$ and $F_{x,i}$ is sensitive to noise. To relieve this problem, we take the Laplacian of Gaussian operation instead of Laplacian in the computation of $F_0(x,y)$ and $F_1(x,y)$. So the energy to be minimized becomes $$E(\Delta x, \Delta y, \theta, \sigma) = \sum_i w_i (F_{x,i}(\Delta x + x_c - x_i) + F_{y,i}(\Delta y + y_c - y_i) + \sigma(f_i \cos\theta + g_i \sin\theta) - f_i + F_0(x_i, y_i) - F_1(x_i, y_i))^2$$

where $w_1$ is the weight associated with the i-th constraint selected at the location $(x_1, y_i)$, $F_{x,i}$ and $F_{y,i}$ are the partial derivatives of the LOG-log image $F_0(x,y)$ along the x and y directions respectively at the location $(x_i, y_1)$, $f_i = F_{x,i}(x_i - x_c) + F_{y,i}(y_i - y_c)$, and $g_i = -F_{x,i}(y_i - y_c) + F_{y,i}(x_i - x_c)$. This energy minimization problem is a nonlinear least square minimization problem.

The training phase for the minimization of this new energy consists of computation of the LOG-log image $F_0(x,y)$, selection of reliable locations, and computing the gradients, i.e. $F_{x,i}$ and $F_{y,i}$, and the qualities $f_i$ and $g_i$ for all the selected locations $(x_i, y_i)$. The selection of reliable locations for the data constraints is very similar to that of the raw-intensity matching mode except for replacing the function $I_0(x,y)$ by the LOG-Log image $F_0(x,y)$. Given a good initial guess for the solution from the hierarchical nearest-neighbor search result, we can use the Newton update as well as a warping-and-estimation scheme in each iteration of energy minimization. Thus, we have the following iterative computation process:

k=0

Repeat until Converged

Compute the Hessian $H^{(k)}$ and gradient $g^{(k)}$ for $$E'(\Delta x, \Delta y, \theta, \sigma; \Delta x^{(k)}, \Delta y^{(k)}, \theta^{(k)}, \sigma^{(k)}) \text{ at } (\Delta x, \Delta y, \theta, \sigma) = (0, 0, 0, 1)$$

$$\begin{pmatrix} \Delta \hat{x} \\ \Delta \hat{y} \\ \hat{\theta} \\ \hat{\sigma} \end{pmatrix} = H^{(k)-1} g^{(k)},$$

$$\sigma^{(k+1)} = \frac{\sigma^{(k)}}{1 - \hat{\sigma}}$$

-continued $$\theta^{(k+1)} = \theta^{(k)} + \hat{\theta},$$

$$\begin{pmatrix} \Delta x^{(k+1)} \\ \Delta y^{(k+1)} \end{pmatrix} = \begin{pmatrix} \Delta x^{(k)} \\ \Delta y^{(k)} \end{pmatrix} + \sigma^{(k+1)} R(\theta^{(k+1)}) \begin{pmatrix} \Delta \hat{x} \\ \Delta \hat{y} \end{pmatrix},$$

$$k = k + 1,$$

Return

Note that the Hessian matrix $H^{(k)}$ is approximated by the outer product $g^{(k)}g^{(k)^T}$, where the vector $g^{(k)}$ is the gradient of the energy function $E'(\Delta x,\Delta y,\theta,\sigma,a,b;\Delta x',\Delta y',\theta',\sigma')$ with respect to the parameter vector $(\Delta x,\Delta y,\theta,\sigma)$ and is given by $$g^{(k)} = 2\sum_{i=1}^{n} w_i \begin{pmatrix} F_{x,i}h_i(\Delta x^{(k)}, \Delta y^{(k)}, \theta^{(k)}, \sigma^{(k)}) \\ F_{y,i}h_i(\Delta x^{(k)}, \Delta y^{(k)}, \theta^{(k)}, \sigma^{(k)}) \\ g_i h_i(\Delta x^{(k)}, \Delta y^{(k)}, \theta^{(k)}, \sigma^{(k)}) \\ f_i h_i(\Delta x^{(k)}, \Delta y^{(k)}, \theta^{(k)}, \sigma^{(k)}) \end{pmatrix}$$

where $h_i(\Delta x^{(k)},\Delta y^{(k)},\theta^{(k)})$ is the residue of the data constraint at the location $(x_i,y_i)$ and can be written as $F_{x,i}(x_c-x_i)+F_{y,i}(y_c-y_i)+f_i+F_0(x_i,y_i)-F_1(x_i,y_i;\Delta x^{(k)},\Delta y^{(k)},\theta^{(k)},\sigma^{(k)})$.

Figure 5A:
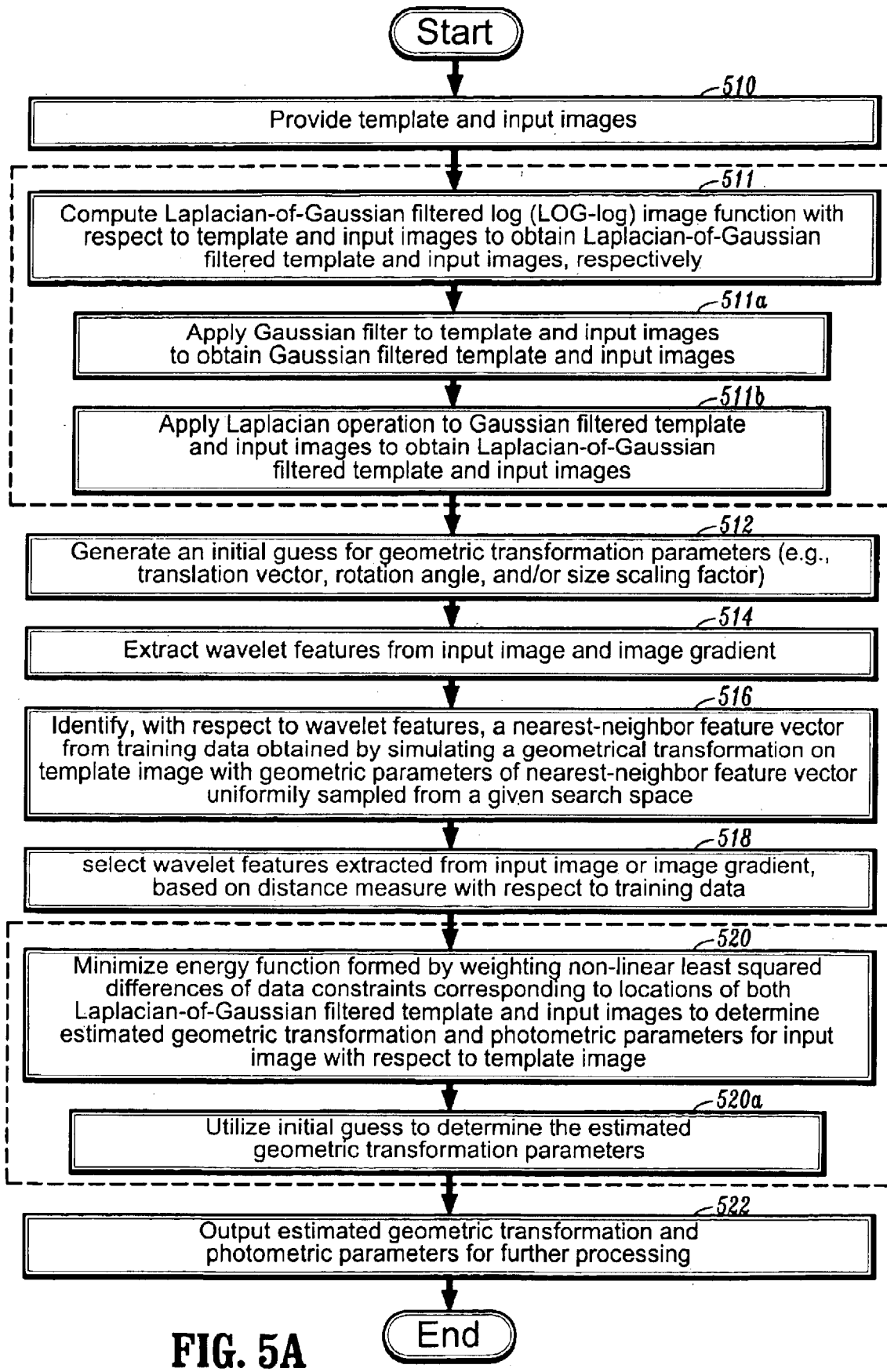
FIG. 5A is a flow diagram illustrating a method for image alignment, according to an illustrative embodiment of the present invention.

FIG. 5A is a flow diagram illustrating a method for image alignment, according to an illustrative embodiment of the invention. For the purposes of the example of FIG. 5A, it is presumed that the distance measures are less for the wavelet features corresponding to the image gradient than for the wavelet features corresponding to the input image and, thus, the LOG-log intensity matching mode is invoked (step 511 below).

A template image and an input image are provided (step 510). A Laplacian-of-Gaussian filtered log (LOG-log) image function is computed with respect to the template image and the input image to obtain a Laplacian-of-Gaussian filtered template image and a Laplacian-of-Gaussian filtered input image, respectively (step 511). Step 511 includes the steps of: applying a Gaussian filter to the template image and the input image to obtain a Gaussian filtered template image and a Gaussian filtered input image, respectively (step 511*a*); and applying a Laplacian operation to the Gaussian filtered template image and the Gaussian filtered input image to obtain the Laplacian-of-Gaussian filtered template image and the Laplacian-of-Gaussian filtered input image, respectively (step 511*b*). Step 511*a* is performed, e.g., so that the Gaussian filtered template image and the Gaussian filtered input image have reduced noise with respect to the template image and the input image, respectively. Step 511*b* is performed, e.g., so that the Laplacian-of-Gaussian filtered template image and the Laplacian-of-Gaussian filtered input image have reduced non-uniform illumination with respect to the template image and the input image, respectively.

An initial guess is generated for geometric transformation parameters (e.g., a translation vector, a rotation angle, and a size scaling factor) of the input image (step 512).

Wavelet features are extracted from the input image and from an image gradient corresponding to the input image (step 514). A nearest-neighbor feature vector from a set of training data is identified with respect to the wavelet features extracted from at least one of the input image and the image gradient (step 516). The training data is obtained by simulating a geometrical transformation on the template image with geometric parameters of the nearest-neighbor feature vector being uniformly sampled from a given search space. The wavelet features extracted from the input image or the image gradient are selected, based on a distance measure with respect to the set of training data (step 518). As noted above, for the example of FIG. 5A it is presumed that the distance measure between the wavelet features extracted from the image gradient and the training data are less than the distance measure between the wavelet features extracted from the input image and the training data.

An energy function is minimized to determine estimated geometric transformation parameters and estimated photometric parameters for the input image with respect to the template image (step 520). The energy function is formed by weighting non-linear least squared differences of data constraints corresponding to locations of both the Laplacian-of-Gaussian filtered template image and the Laplacian-of-Gaussian filtered input image. The initial guess generated at step 512 is utilized by the minimizing step to determine the estimated geometric transformation parameters (step 520*a*).

The estimated geometric transformation parameters and the estimated photometric parameters are output for further processing (step 522).

Figure 5B:
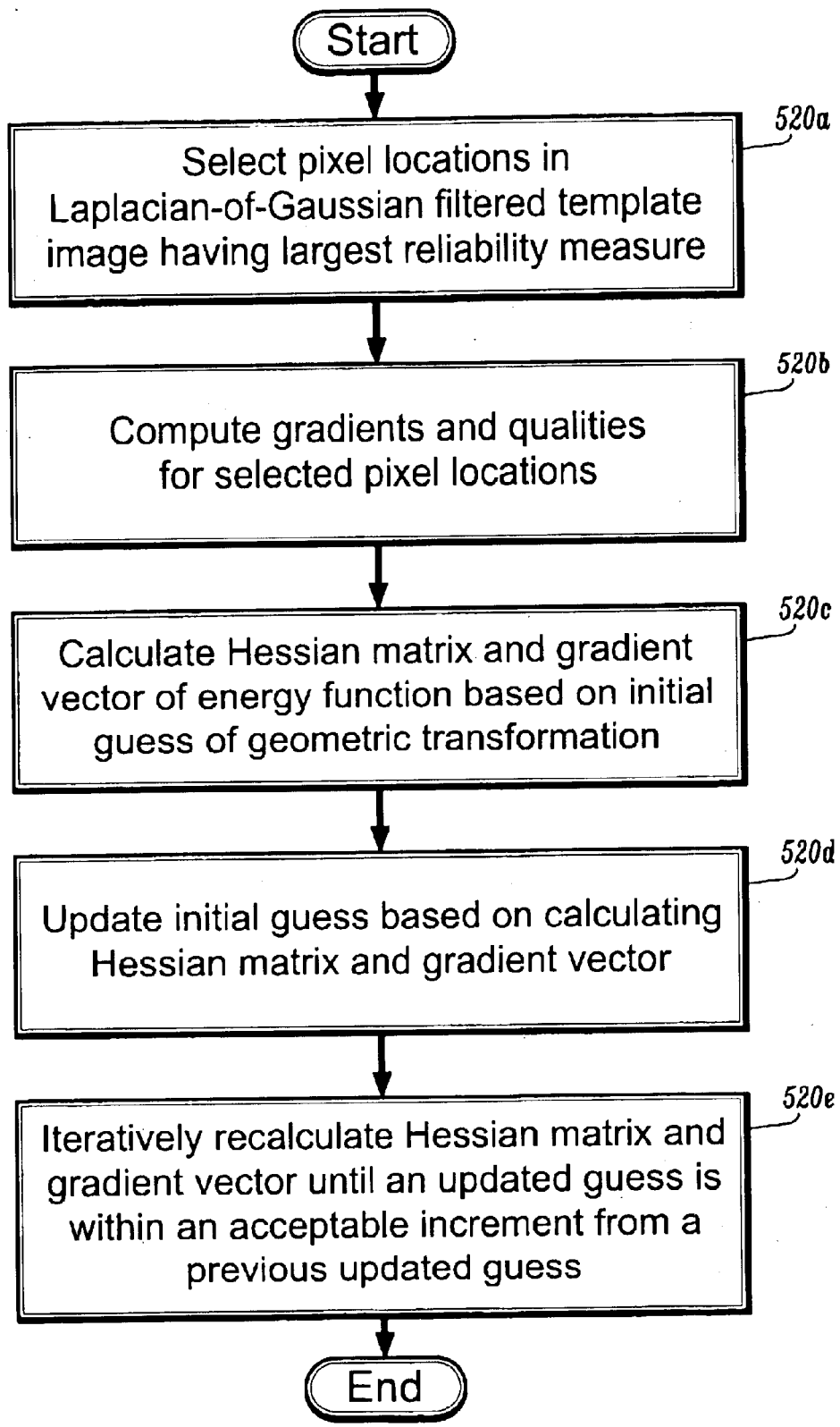
FIG. 5B is a flow diagram further illustrating step 520 of FIG. 5A, according to an illustrative embodiment of the invention.

FIG. 5B is a flow diagram further illustrating step 520 of FIG. 5A, according to an illustrative embodiment of the invention. For the purposes of this example, it is presumed that the distance measures are less for the wavelet features corresponding to the image gradient and, thus, the LOG-log intensity matching mode is invoked.

Pixel locations in the Laplacian-of-Gaussian filtered template image having the largest reliability measure are selected (step 520*a*).

Gradients and qualities are computed for the selected pixel locations (step 520*b*).

A Hessian matrix and a gradient vector of the energy function are calculated based on the initial guess of the geometric transformation parameters (step 520*c*). The initial guess is updated based on the calculating of the Hessian matrix and the gradient vector of the energy function (step 520*d*). The Hessian matrix and the gradient vector of the energy function are iteratively recalculated until an updated guess is within an acceptable increment from a previous updated guess (step 520*e*).

A brief description of some experimental results obtained by the present invention will now be given. The invention has been tested on a variety of industrial images and has obtained very satisfactory results. Some of the experiments are shown below. The sizes of all images are 400×400.

Figure 6A:
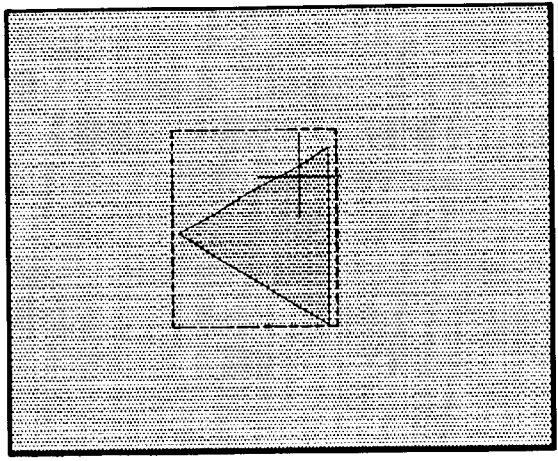
FIGS. 6a–d are diagrams illustrating an original template image of a triangle pattern, and alignment results for images aligned with the template image under very high levels of noise and non-uniform illumination, according to various illustrative embodiments of the present invention.
Figure 6B:
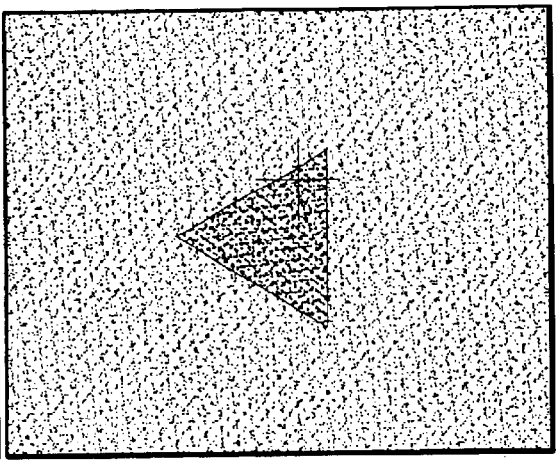
Figure 6C:
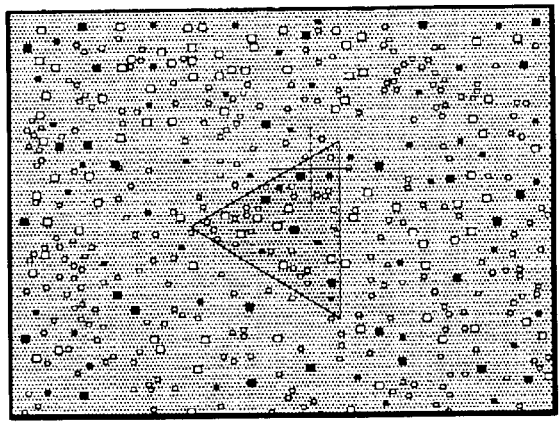
Figure 6D:
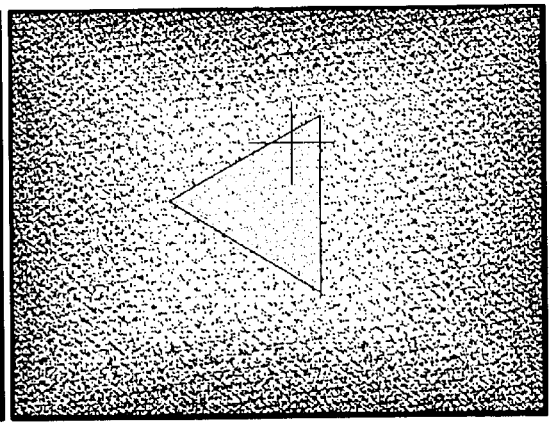

FIGS. 6*a*–*d* are diagrams illustrating an original template image of a triangle pattern, and alignment results for images aligned with the template image under very high levels of noise and non-uniform illumination, according to various illustrative embodiments of the present invention. In particular, FIG. 6*a* is a diagram illustrating the original template image with a template window and a reference cross sign, and FIGS. 6*b*–*d* are diagrams illustrating the alignment results for images with fine-structured noises, blocky-noises, and non-uniform illumination, respectively. Note that the cross signs indicate the estimated position and orientation of the reference cross. Under normal cases, the accuracy of the alignment is within +/−0.1 pixels in shifts along both x and y directions and +/−0.05 degrees in rotation. For the large non-uniform illumination case, the accuracy is within +/−0.15 pixels in shifts along x and y directions and +/−0.05 degrees in rotation. For the very noisy cases, the accuracy degrades to +/−0.7 pixels in shifts along x and y directions and +/−0.4 degrees in rotation.

Figure 7A:
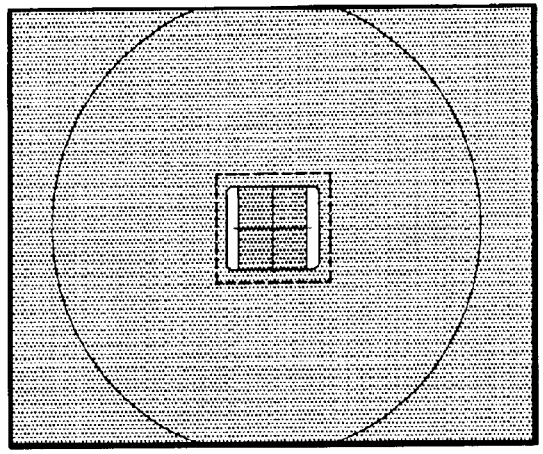
FIGS. 7a–d are diagrams illustrating an original template image of a component, and alignment results for images aligned with the template image under very high levels of noise and non-uniform illumination, according to other various illustrative embodiments of the present invention.
Figure 7B:
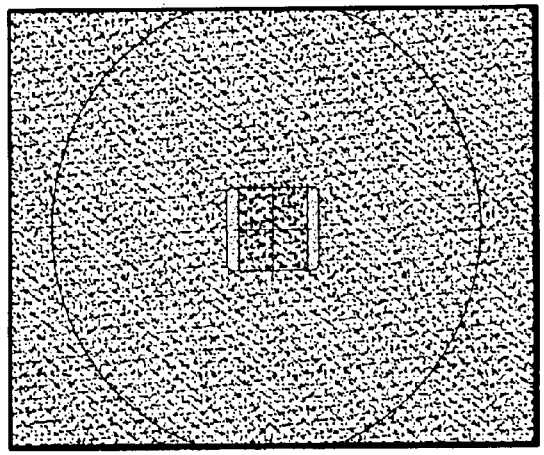
Figure 7C:
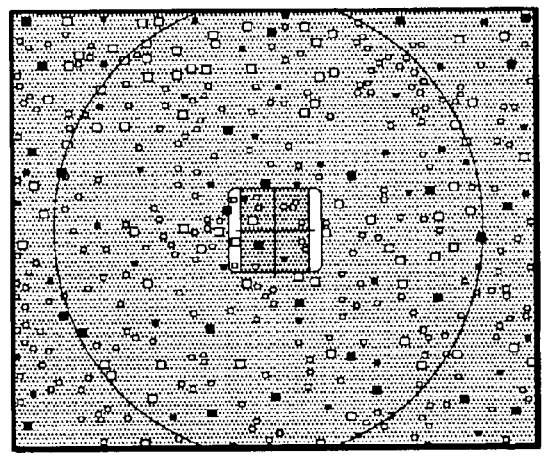
Figure 7D:
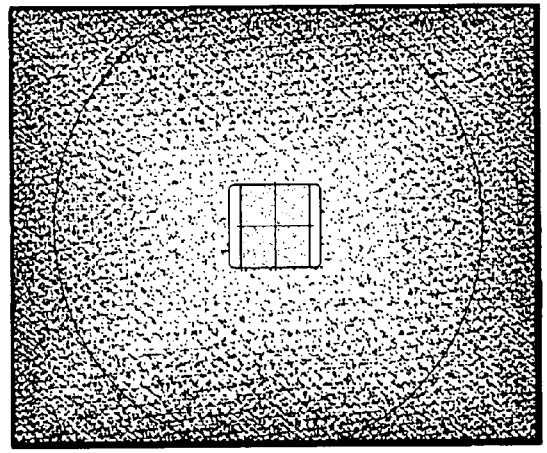

Another set of experiments on the alignment of a component for pick-and-place applications is shown in FIGS. 7*a*–*d*. FIGS. 7*a*–*d* are diagrams illustrating an original template image of a component, and alignment results for images aligned with the template image under very high levels of noise and non-uniform illumination, according to other various illustrative embodiments of the present invention. In particular, FIG. 7*a* is a diagram illustrating the original template image with a template window and a reference cross sign, and FIGS. 7*b*–*d* are diagrams illustrating the alignment results for images with fine-structured noises, blocky-noises, and non-uniform illumination, respectively. The cross signs indicate the estimated position and orientation of the reference cross. Under normal cases, the accuracy of the alignment is within +/−0.1 pixels in shifts along both x and y directions and +/−0.1 degrees in rotation. For the large non-uniform illumination case, the accuracy is within +/−0.8 pixels in shifts along x and y directions and +/−0.1 degrees in rotation. For the very noisy cases, the accuracy degrades to +/−0.2 pixels in shifts along x and y directions and +/−0.15 degrees in rotation.

Figure 8A:
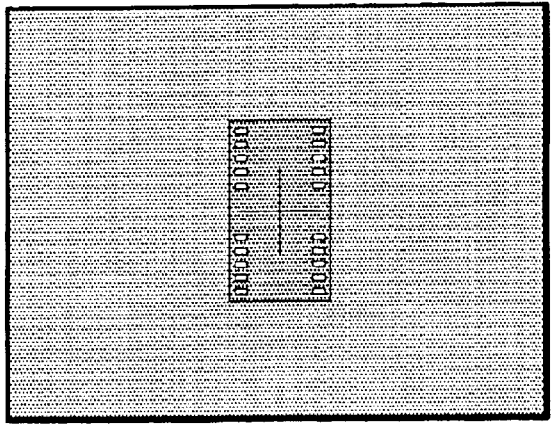
FIGS. 8a–d are diagrams illustrating an original template image of an integrated circuit (IC) pattern, and alignment results for images aligned with the template image under very high levels of noise and non-uniform illumination, according to yet other various illustrative embodiments of the present invention.
Figure 8B:
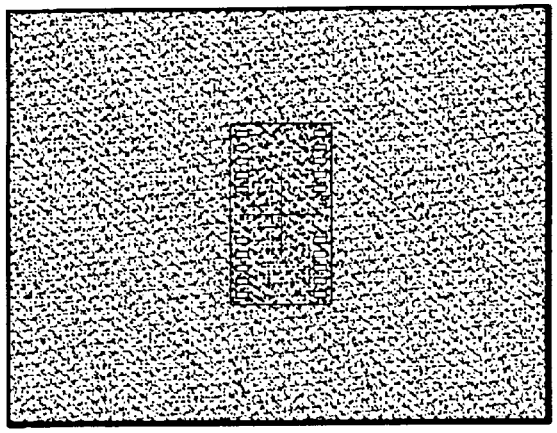
Figure 8C:
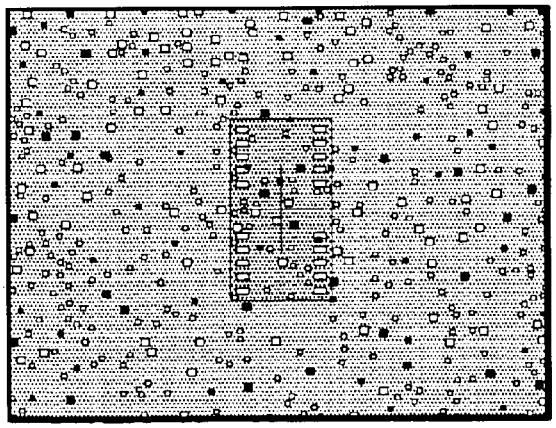
Figure 8D:
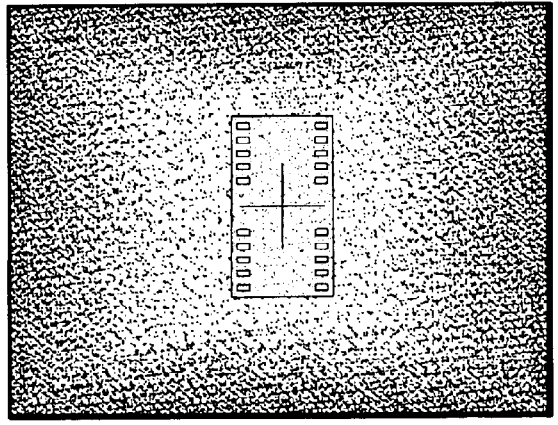

FIGS. 8a–d are diagrams illustrating an original template image of an integrated circuit (IC) pattern, and alignment results for images aligned with the template image under very high levels of noise and non-uniform illumination, according to yet other various illustrative embodiments of the present invention. In particular, FIG. 8a is a diagram illustrating the original template image with a template window and a reference cross sign, and FIGS. 8b–d are diagrams illustrating the alignment results for images with fine-structured noises, blocky-noises, and non-uniform illumination, respectively. The cross signs indicate the estimated position and orientation of the reference cross. The accuracy of the alignment is normally within +/−0.2 pixels in shifts along both x and y directions and +/−0.2 degrees in rotation for most of the cases.

The execution time for the present invention depends on the size of the template, the mode of matching in the energy minimization alignment, and the number of iterations required in the iterative minimization procedure. For the examples given in this section, it takes roughly 0.03–0.05 seconds for the raw-intensity matching mode and 0.09–0.14 seconds on a Pentium II 40 MHz PC with 128 Mb RAM running NT 4.0.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for matching images, comprising the steps of:
providing a template image and an input image;
computing a Laplacian-of-Gaussian filtered log (LOG-log) image function with respect to the template image and the input image to obtain a Laplacian-of-Gaussian filtered template image and a Laplacian-of-Gaussian filtered input image, respectively;
minimizing an energy function formed by weighting non-linear least squared differences of data constraints corresponding to locations of both the Laplacian-of-Gaussian filtered template image and the Laplacian-of-Gaussian filtered input image to determine estimated geometric transformation parameters and estimated photometric parameters for the input image with respect to the template image; and
outputting the estimated geometric transformation parameters and the estimated photometric parameters for further processing.

2. The method according to claim 1, further comprising the steps of:
extracting wavelet features from an image gradient corresponding to the input image;
identifying, with respect to the wavelet features, a nearest-neighbor feature vector from a set of training data, the training data obtained by simulating a geometrical transformation on the template image with geometric parameters of the nearest-neighbor feature vector being uniformly sampled from a given search space; and
generating an initial guess for the estimated geometric transformation parameters, based upon the geometric parameters of the nearest-neighbor feature vector,
wherein the initial guess is utilized by the minimizing step to determine the estimated geometric transformation parameters.

3. The method according to claim 1, wherein said minimizing step comprises the steps of:
selecting pixel locations in the Laplacian-of-Gaussian filtered template image having a largest reliability measure; and
computing gradients and qualities for the selected pixel locations.

4. The method according to claim 1, wherein the geometric parameters comprise at least one of a translation vector, a rotation angle, and a size scaling factor.

5. The method according to claim 1, wherein said minimizing step further comprises the steps of:
calculating a Hessian matrix and a gradient vector of the energy function based on an initial guess of the geometric transformation parameters;
updating the initial guess based on the calculating of the Hessian matrix and the gradient vector of the energy function; and
iteratively recalculating the Hessian matrix and the gradient vector of the energy function until an updated guess is within an acceptable increment from a previous updated guess.

6. The method according to claim 1, wherein said computing step comprises the steps of:
applying a Gaussian filter to the template image and the input image to obtain a Gaussian filtered template image and a Gaussian filtered input image, respectively; and
applying a Laplacian operation to the Gaussian filtered template image and the Gaussian filtered input image to obtain the Laplacian-of-Gaussian filtered template image and the Laplacian-of-Gaussian filtered input image, respectively.

7. The method according to claim 6, wherein the Gaussian filtered template image and the Gaussian filtered input image have reduced noise with respect to the template image and the input image, respectively, and the Laplacian-of-Gaussian filtered template image and the Laplacian-of-Gaussian filtered input image have reduced non-uniform illumination with respect to the template image and the input image, respectively.

8. A method for matching images, comprising the steps of:
providing a template image and an input image;
computing a Laplacian-of-Gaussian filtered log (LOG-log) image function with respect to the template image and the input image to obtain a Laplacian-of-Gaussian filtered template image and a Laplacian-of-Gaussian filtered input image, respectively;
generating an initial guess for estimated geometric transformation parameters of the input image;
minimizing an energy function formed by weighting non-linear least squared differences of data constraints corresponding to locations of both the Laplacian-of-Gaussian filtered template image and the Laplacian-of-Gaussian filtered input image to determine the estimated geometric transformation parameters and estimated photometric parameters for the input image with respect to the template image; and outputting the estimated geometric transformation parameters and the estimated photometric parameters for further processing,
wherein the initial guess is utilized by the minimizing step to determine the estimated geometric transformation parameters.

9. The method according to claim 8, further comprising the steps of:
extracting wavelet features from an image gradient corresponding to the input image;
identifying, with respect to the wavelet features, a nearest-neighbor feature vector from a set of training data, the training data obtained by simulating a geometrical transformation on the template image with geometric parameters of the nearest-neighbor feature vector being uniformly sampled from a given search space; and
generating the initial guess for the estimated geometric transformation parameters, based upon the geometric parameters of the nearest-neighbor feature vector.

10. The method according to claim 8, wherein said minimizing step comprises the steps of:
selecting pixel locations in the Laplacian-of-Gaussian filtered template image having a largest reliability measure; and
computing gradients and qualities for the selected pixel locations.

11. The method according to claim 8, wherein the geometric parameters comprise at least one of a translation vector, a rotation angle, and a size scaling factor.

12. The method according to claim 8, wherein said minimizing step further comprises the steps of:
calculating a Hessian matrix and a gradient vector of the energy function based on the initial guess of the geometric transformation parameters;
updating the initial guess based on the calculating of the Hessian matrix and the gradient vector of the energy function; and
iteratively recalculating the Hessian matrix and the gradient vector of the energy function until an updated guess is within an acceptable increment from a previous updated guess.

13. The method according to claim 8, wherein said computing step comprises the steps of:
applying a Gaussian filter to the template image and the input image to obtain a Gaussian filtered template image and a Gaussian filtered input image, respectively; and
applying a Laplacian operation to the Gaussian filtered template image and the Gaussian filtered input image to obtain the Laplacian-of-Gaussian filtered template image and the Laplacian-of-Gaussian filtered input image, respectively.

14. The method according to claim 13, wherein the Gaussian filtered template image and the Gaussian filtered input image have reduced noise with respect to the template image and the input image, respectively, and the Laplacian-of-Gaussian filtered template image and the Laplacian-of-Gaussian filtered input image have reduced non-uniform illumination with respect to the template image and the input image, respectively.

15. A program storage device readable by machine, tangibly embodying a program of instructions executable by the machine to perform method steps for matching images, said method steps comprising:
providing a template image and an input image;
computing a Laplacian-of-Gaussian filtered log (LOG-log) image function with respect to the template image and the input image to obtain a Laplacian-of-Gaussian filtered template image and a Laplacian-of-Gaussian filtered input image, respectively;
minimizing an energy function formed by weighting non-linear least squared differences of data constraints corresponding to locations of both the Laplacian-of-Gaussian filtered template image and the Laplacian-of-Gaussian filtered input image to determine estimated geometric transformation parameters and estimated photometric parameters for the input image with respect to the template image; and
outputting the estimated geometric transformation parameters and the estimated photometric parameters for further processing.

16. The program storage device according to claim 15, further comprising the steps of:
extracting wavelet features from an image gradient corresponding to the input image;
identifying, with respect to the wavelet features, a nearest-neighbor feature vector from a set of training data, the training data obtained by simulating a geometrical transformation on the template image with geometric parameters of the nearest-neighbor feature vector being uniformly sampled from a given search space; and
generating an initial guess for the estimated geometric transformation parameters, based upon the geometric parameters of the nearest-neighbor feature vector,
wherein the initial guess is utilized by the minimizing step to determine the estimated geometric transformation parameters.

17. The program storage device according to claim 15, wherein said minimizing step comprises the steps of:
selecting pixel locations in the Laplacian-of-Gaussian filtered template image having a largest reliability measure; and
computing gradients and qualities for the selected pixel locations.

18. The program storage device according to claim 15, wherein the geometric parameters comprise at least one of a translation vector, a rotation angle, and a size scaling factor.

19. The program storage device according to claim 15, wherein said minimizing step further comprises the steps of:
calculating a Hessian matrix and a gradient vector of the energy function based on an initial guess of the geometric transformation parameters;
updating the initial guess based on the calculating of the Hessian matrix and the gradient vector of the energy function; and
iteratively recalculating the Hessian matrix and the gradient vector of the energy function until an updated guess is within an acceptable increment from a previous updated guess.

20. The program storage device according to claim 15, wherein said computing step comprises the steps of:
applying a Gaussian filter to the template image and the input image to obtain a Gaussian filtered template image and a Gaussian filtered input image, respectively; and
applying a Laplacian operation to the Gaussian filtered template image and the Gaussian filtered input image to obtain the Laplacian-of-Gaussian filtered template image and the Laplacian-of-Gaussian filtered input image, respectively.

21. The method according to claim 20, wherein the Gaussian filtered template image and the Gaussian filtered input image have reduced noise with respect to the template image and the input image, respectively, and the Laplacian-of-Gaussian filtered template image and the Laplacian-of-Gaussian filtered input image have reduced non-uniform illumination with respect to the template image and the input image, respectively.

* * * * *